(12) United States Patent
Jeong et al.

(10) Patent No.: US 8,468,459 B2
(45) Date of Patent: Jun. 18, 2013

(54) MOBILE TERMINAL AND METHOD OF DISPLAYING INFORMATION THEREIN

(75) Inventors: Kye Sook Jeong, Seoul (KR); Hye Eun Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 338 days.

(21) Appl. No.: 12/242,282

(22) Filed: Sep. 30, 2008

(65) Prior Publication Data

US 2009/0106665 A1    Apr. 23, 2009

(30) Foreign Application Priority Data

Oct. 19, 2007  (KR) .................. 10-2007-0105476

(51) Int. Cl.
*G06F 3/00*    (2006.01)

(52) U.S. Cl.
USPC ........ 715/748; 715/859; 455/566; 348/207.1; 348/231; 348/552

(58) Field of Classification Search
USPC ............................................... 715/748, 859
See application file for complete search history.

(56) References Cited

U.S. PATENT DOCUMENTS

| | | | |
|---|---|---|---|
| 6,784,925 B1 | 8/2004 | Tomat et al. | |
| 6,950,198 B1* | 9/2005 | Berarducci et al. | 358/1.12 |
| 7,327,385 B2* | 2/2008 | Yamaguchi | 348/207.1 |
| 7,551,945 B2* | 6/2009 | Okada et al. | 455/566 |
| 2001/0015756 A1* | 8/2001 | Wilcock et al. | 348/158 |
| 2001/0017668 A1* | 8/2001 | Wilcock et al. | 348/552 |
| 2004/0004663 A1* | 1/2004 | Kahn et al. | 348/207.1 |
| 2004/0116148 A1* | 6/2004 | Ku | 455/550.1 |
| 2004/0179115 A1* | 9/2004 | Tomat et al. | 348/231.6 |
| 2005/0034084 A1* | 2/2005 | Ohtsuki et al. | 715/864 |
| 2005/0080872 A1* | 4/2005 | Davis et al. | 709/217 |
| 2005/0102635 A1 | 5/2005 | Jiang et al. | |
| 2005/0197141 A1* | 9/2005 | Jiang et al. | 455/457 |
| 2005/0266839 A1* | 12/2005 | Paul et al. | 455/418 |
| 2006/0105806 A1* | 5/2006 | Vance et al. | 455/556.1 |
| 2007/0159651 A1* | 7/2007 | Disario et al. | 358/1.15 |
| 2007/0189746 A1* | 8/2007 | Park | 396/56 |
| 2008/0052945 A1* | 3/2008 | Matas et al. | 34/173 |
| 2008/0108299 A1* | 5/2008 | Hullot et al. | 455/3.01 |

(Continued)

FOREIGN PATENT DOCUMENTS

| | | |
|---|---|---|
| CN | 1767682 A | 5/2006 |
| CN | 101022528 A | 8/2007 |
| EP | 1 819 139 A1 | 8/2007 |

OTHER PUBLICATIONS

Sarvas et al., "MobShare: Controlled and Immediate Sharing of Mobile Images," Helsinki Institute for Information Technology (HIIT), XP-002474338, pp. 724-731, Oct. 2004.

*Primary Examiner* — Steven Sax
*Assistant Examiner* — Linh K Pham
(74) *Attorney, Agent, or Firm* — Birch, Stewart, Kolasch & Birch, LLP (57) ABSTRACT

A mobile terminal, computer program product and method of displaying information therein are disclosed, by which data stored in the mobile terminal can be uploaded to a website to be shared. The present invention includes a camera for taking a picture, a memory for storing data, a wireless communication unit for transmitting the data, a display displaying the data stored in the memory, and a controller controlling the data transmitted among the data stored in the memory to be displayed by being discriminated from the data not transmitted.

16 Claims, 8 Drawing Sheets

U.S. PATENT DOCUMENTS

2008/0133697 A1* 6/2008 Stewart et al. .............. 709/217
2008/0242359 A1* 10/2008 Seol et al. .................. 455/566
2008/0301180 A1* 12/2008 Klassen et al. ............ 707/103 R
2009/0164606 A1* 6/2009 Epifania et al. .............. 709/219

* cited by examiner

MOBILE TERMINAL AND METHOD OF DISPLAYING INFORMATION THEREIN

CROSS REFERENCE TO RELATED APPLICATIONS

This application claims the benefit of the Korean Patent Application No. KR 10-2007-0105476, filed on Oct. 19, 2007, which is hereby incorporated by reference as if fully set forth herein.

BACKGROUND OF THE INVENTION

1. Field of the Invention

The present invention relates to a mobile terminal, and more particularly, to a mobile terminal and method of displaying information therein. Although the present invention is suitable for a wide scope of applications, it is particularly suitable for uploading data stored in the mobile terminal to a website.

2. Discussion of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

Recently, technologies for sharing data stored in a mobile terminal have been developed. For instance, many efforts have been made to research and develop the technology for sharing data stored in a mobile terminal by uploading the data to a website.

SUMMARY OF THE INVENTION

Accordingly, the present invention is directed to a mobile terminal, computer program product and method of displaying information therein that substantially obviate one or more problems due to limitations and disadvantages of the related art.

An object of the present invention is to provide a mobile terminal, computer program product and method of displaying information therein, by which data stored in the mobile terminal can be uploaded to a website to be shared.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a camera for taking a picture, a memory for storing data, a wireless communication unit for transmitting the data, a display displaying the data stored in the memory, and a controller controlling the data transmitted among the data stored in the memory to be displayed by being discriminated from the data not transmitted.

In another aspect of the present invention, a method of displaying information in a mobile terminal includes displaying data uploaded to a website to be discriminated from data not uploaded, receiving selection of one from the uploaded data, and displaying upload information on the selected data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

Figure 1:
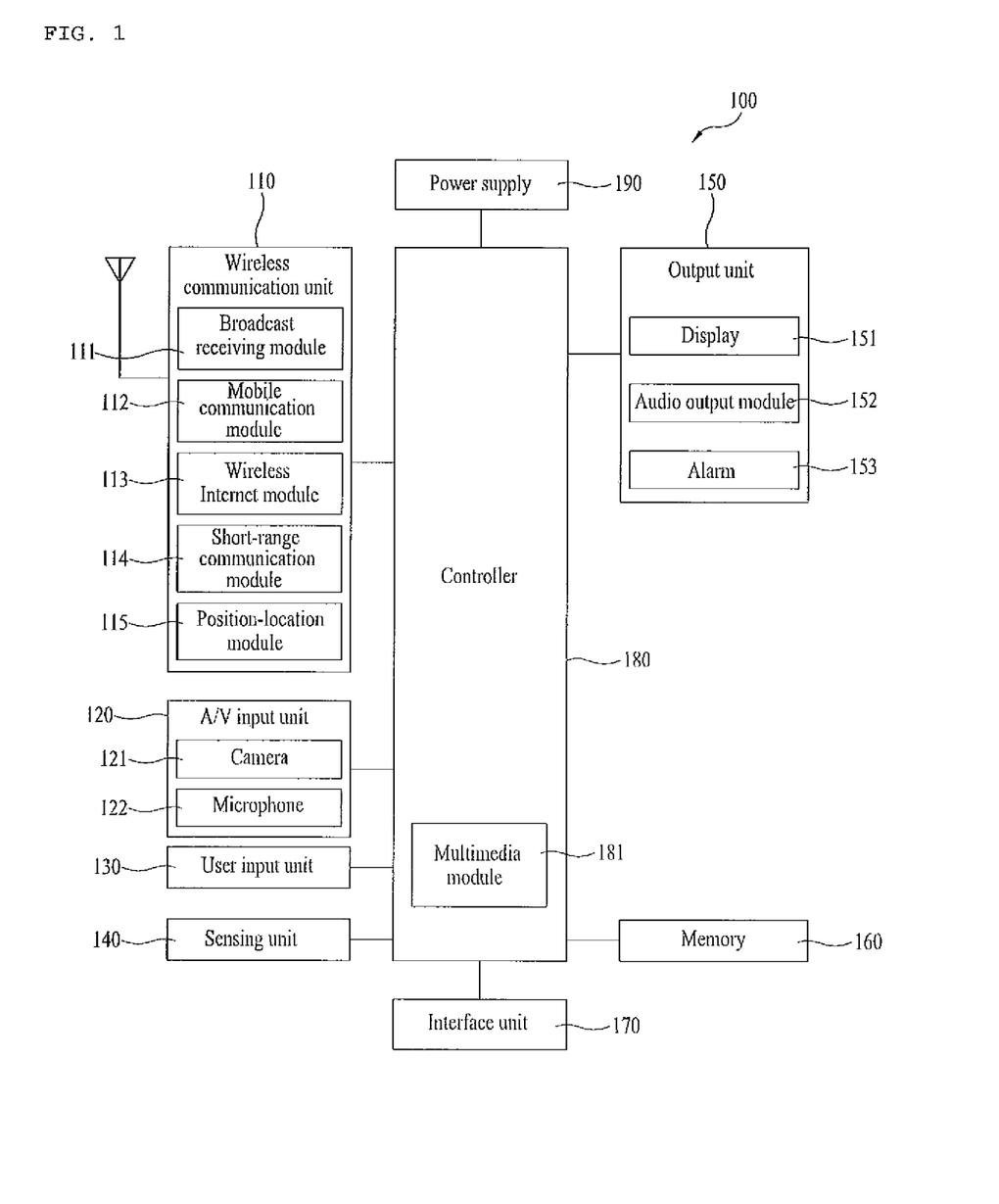
FIG. 1 is a block diagram of a mobile terminal in accordance with an embodiment of the present invention.

FIG. 1 is a block diagram of mobile terminal 100 in accordance with an embodiment of the present invention. The mobile terminal may be implemented using a variety of different types of terminals. Examples of such terminals include mobile phones, user equipment, smart phones, computers, digital broadcast terminals, personal digital assistants, portable multimedia players (PMP) and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB T), digital multimedia broadcasting satellite (DMB-S), digital video broadcast handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile terminal. If desired, this module may be implemented using global positioning system (GPS) components which cooperate with associated satellites, network components, and combinations thereof.

Audio/video (A/V) input unit 120 is configured to provide audio or video signal input to the mobile terminal. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal. Display 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 which supports the audio output requirements of the mobile terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received and user input received. An example of such output includes the providing of tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile terminal. Examples of such data include program instructions for applications operating on the mobile terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile terminal 100 may be implemented in a variety of different configurations. Examples of such configurations include folder-type, slide type, bar-type, rotational-type, swing-type and combinations thereof. For clarity, further disclosure will primarily relate to a slide-type mobile terminal. However such teachings apply equally to other types of terminals.

Figure 2:
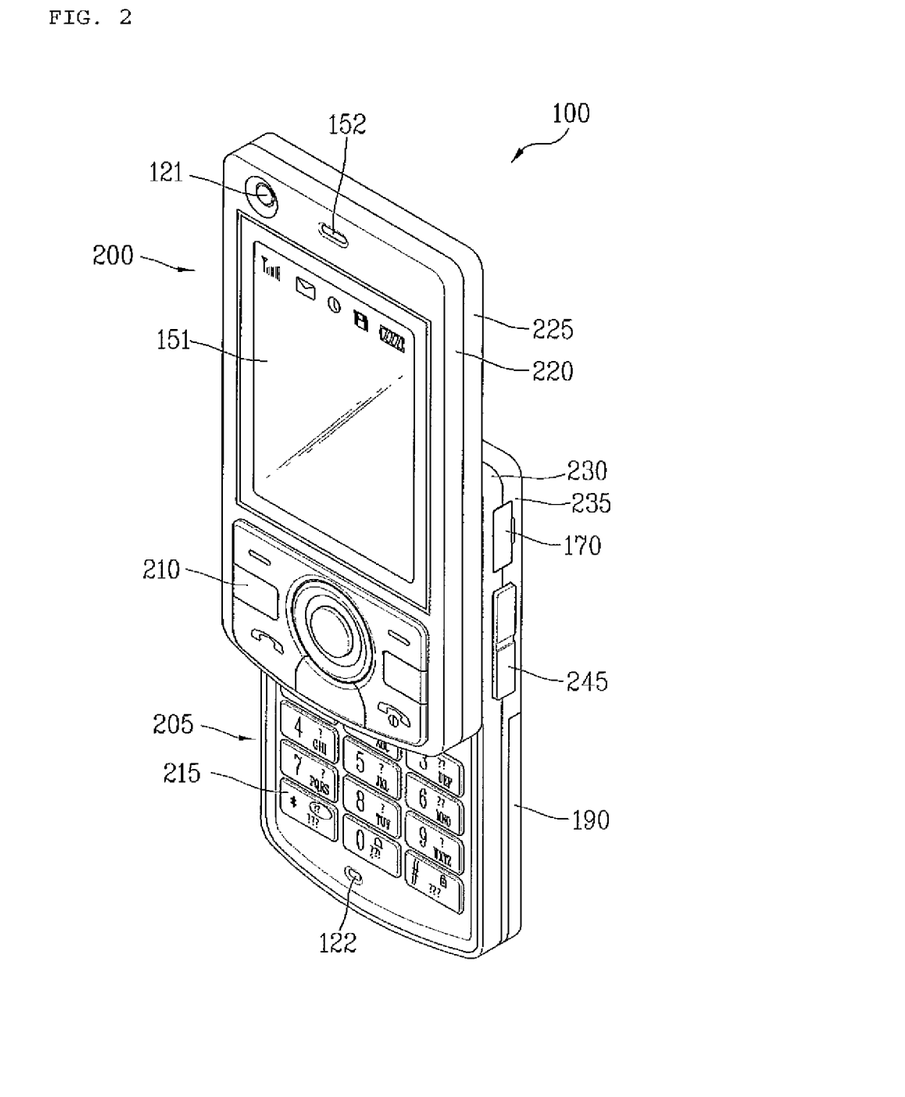
FIG. 2 is a perspective view of a front side of a mobile terminal according to an embodiment of the present invention.

FIG. 2 is a perspective view of a front side of a mobile terminal according to an embodiment of the present invention. In FIG. 2, the mobile terminal 100 is shown having a first body 200 configured to slideably cooperate with a second body 205. The user input unit (described in FIG. 1) is implemented using function keys 210 and keypad 215. The function keys 210 are associated with first body 200, and the keypad 215 is associated with second body 205. The keypad includes various keys (e.g., numbers, characters, and symbols) to enable a user to place a call, prepare a text or multimedia message, and otherwise operate the mobile terminal.

The first body 200 slides relative to second body 205 between open and closed positions. In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys are associated with a particular function of the mobile terminal. An interface unit 170 is shown positioned adjacent to the side keys 245, and a power supply 190 in a form of a battery is located on a lower portion of the second body 205.

Figure 3:
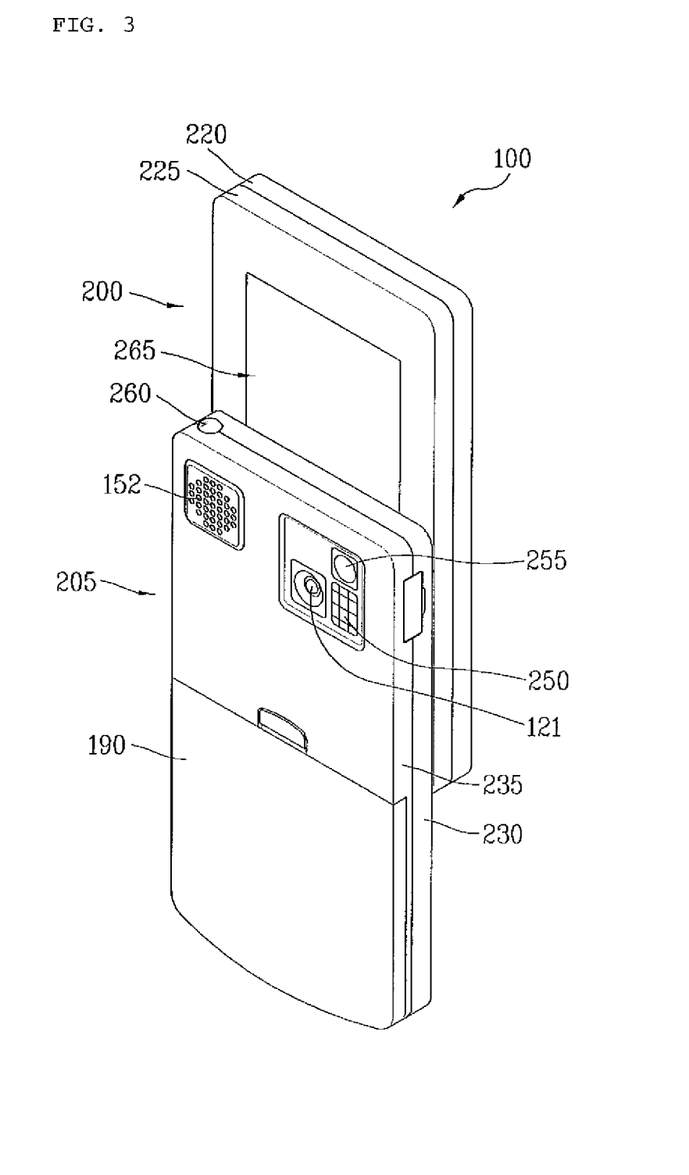
FIG. 3 is a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system which transmits data via frames or packets, including both wireless and wireline communication systems, and satellite based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
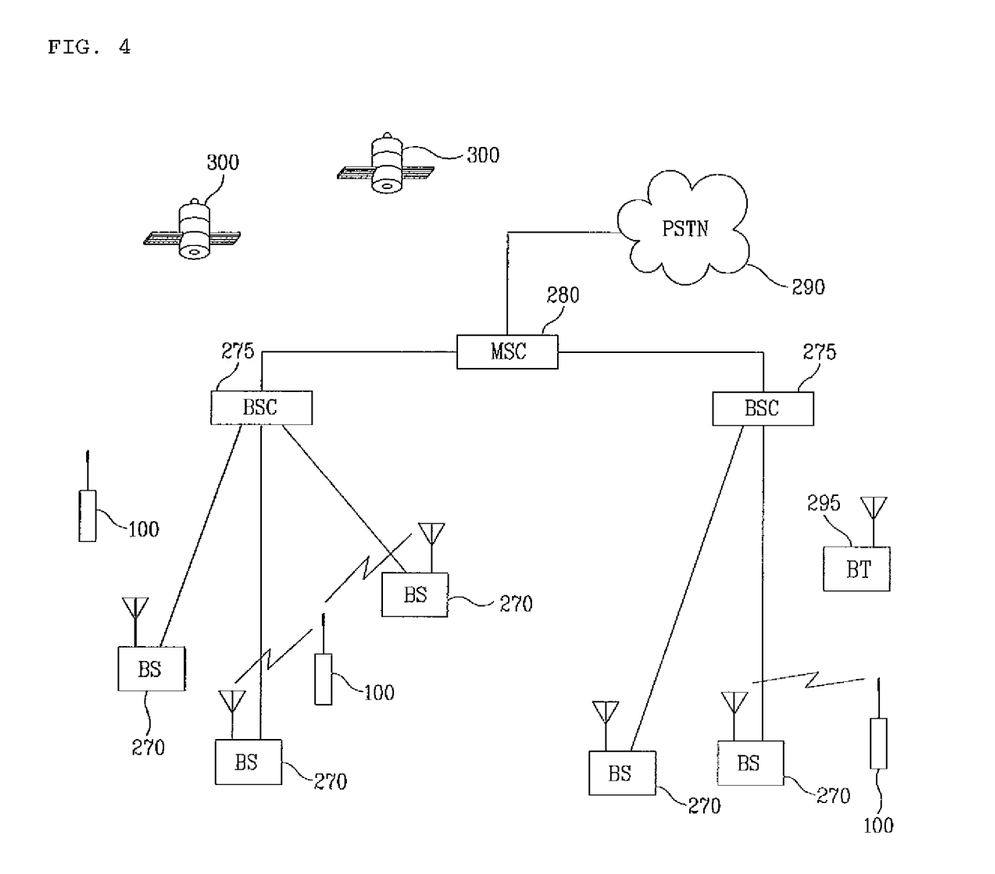
FIG. 4 is a block diagram of a CDMA wireless communication system operable with the mobile terminal of FIGS. 1 to 3.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable terminals 100 operating within the system. The broadcast receiving module 111 (FIG. 1) of the portable terminal is typically configured to receive broadcast signals transmitted by the DMB transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

In the following description, a method of displaying information in a mobile terminal according to one embodiment of the present invention is explained.

First of all, the controller 180 is capable of displaying data stored in the memory 160 in accordance with a specific key input. For instance, the data stored in the memory 160 can include a moving picture file, an image file, a music file, etc. In particular, a moving picture or image is taken using the camera 121. And, the taken moving picture or image can be stored in the memory 160. The data stored in the memory 160 can include data having transmitted to a specific site or a specific correspondent side and non-transmitted data.

According to one embodiment of the present invention, the controller 180 can display data having been transmitted to a specific place or a specific correspondent side to be discriminated from non transmitted data.

The transmission can include a transmission for uploading data to a specific website, MMS, e-mail, IM, Bluetooth, a data transmission via video communication or the like. And, the specific website can include a UCC (user created contents) sharing site for example.

A method of displaying data having been uploaded to a specific website is explained as follows.

Figure 5:
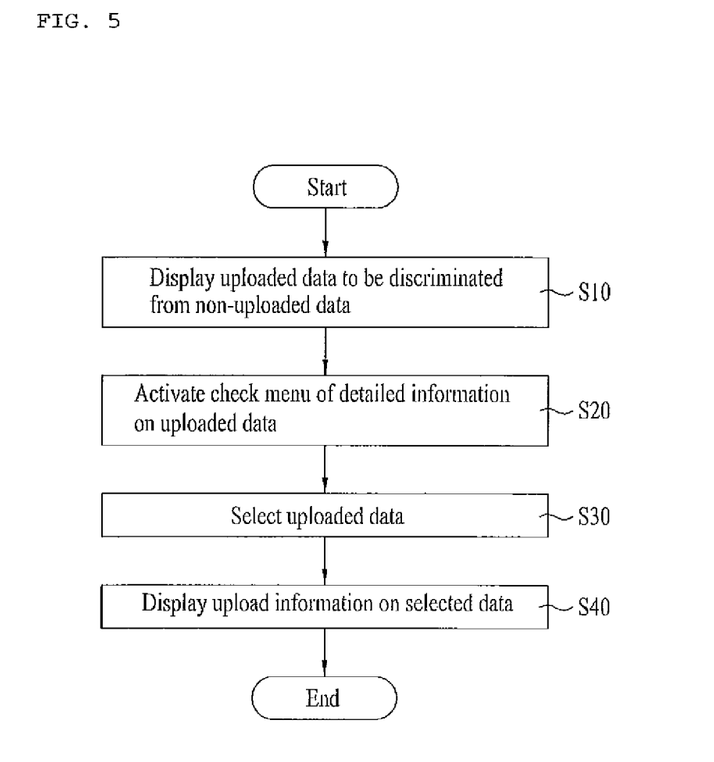
FIG. 5 is a flowchart for a method of displaying information in a mobile terminal according to one embodiment of the present invention.

FIG. 5 is a flowchart for a method of displaying information in a mobile terminal according to one embodiment of the present invention.

First of all, data stored in the memory 160 can include data having been uploaded to a specific website or data not uploaded yet. The uploaded or non-uploaded data may include one of a still image and a moving image captured by the camera. And, the data can be displayed in various ways. For instance, the data can be displayed in a format of list, thumbnail, table or the like. In this case, the controller 180 can display the data having been uploaded to the specific website and the data not uploaded yet in a manner of discriminating the data from each other [S10]. For instance, the controller 180 is programmed to display the data having been uploaded to the specific website so as to enable a user to visibly discriminate between icons representing the data having been uploaded to the specific website from the data not yet uploaded. In various embodiments, the controller 180 may discriminate between such icons by controlled use of brightness, color, icon, transparency, bold marks, etc. in the display of icons. Examples for this are shown in FIG. 6 and FIG. 7.

Figure 6:
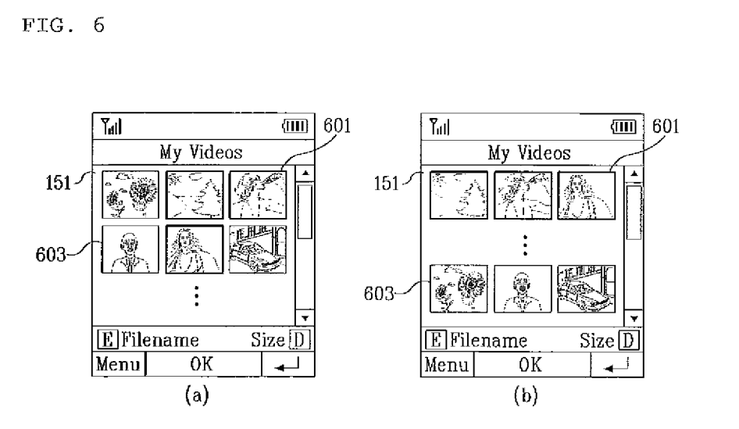
FIGS. 6 to 13 are diagrams for examples of displaying information in a mobile terminal according to one embodiment of the present invention.
Figure 7:
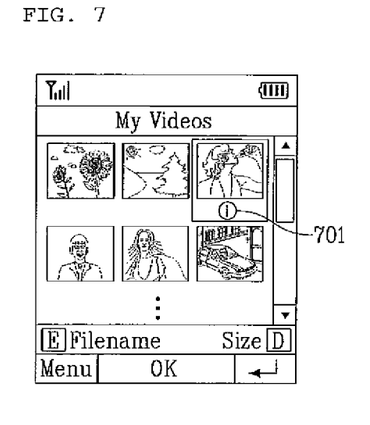

FIG. 6 shows an example for displaying information in a mobile terminal according to one embodiment of the present invention.

Referring to FIG. 6, the controller 180 is able to display data 601 having been uploaded to a specific website to be discriminated from not-yet-uploaded data 603 in a manner of putting a bold mark on the border of the data 601 having been uploaded to the specific website [(a) of FIG. 6].

The controller 180 is able to display only the uploaded data through sorting [(b) of FIG. 6]. Through the sorting, a user is able to recognize which data has been uploaded at a glance. And, the controller 180 is able to control uploaded data to be displayed only through sorting (not shown in the drawing).

FIG. 7 shows another example for displaying information in a mobile terminal according to one embodiment of the present invention.

Referring to FIG. 7, data is displayed in a format of thumbnail. The controller 180 is able to control data having been uploaded to a specific website to be discriminated from non-uploaded data in a manner of marking an icon 701 below the data displayed in the thumbnail format.

Through the above discrimination, a user is able to know which data is uploaded or not. Hence, the user is able to efficiently perform data management. For instance, in case that a memory size is insufficient, since it is able to check already-uploaded data from a specific website, a space of the memory 160 can be efficiently utilized by deleting the uploaded data.

Meanwhile, if data is displayed in a format of thumbnail, a user can intuitively and visually recognize contents of the displayed data. The controller 180 is able to edit or delete the stored data. And, the controller 180 is able to generate and store new data in addition.

According to one embodiment of the present invention, the mobile terminal 100 can interoperate with a specific website to which data has been uploaded. For instance, in case that the uploaded data is deleted from the mobile terminal 100, the uploaded data can be deleted from the specific website as well.

Figure 8:
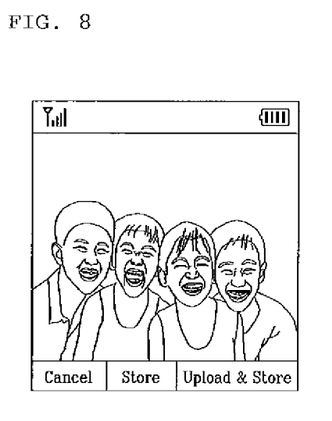

According to one embodiment of the present invention, the uploaded data can include a still picture or a moving picture taken by the camera 121. In particular, the controller 180 uploads the taken moving or still picture to a specific website. If the upload is completed, the controller 180 is able to display the uploaded data in a manner of discriminating the uploaded data from other data. In this case, the controller 1800 can perform the upload together with storage of the taken still or moving picture. This example is shown in FIG. 8 which shows a screen after completion of taking a picture. On the screen shown in FIG. 8, it is able to simultaneously perform both a storage of a taken picture and an upload of the taken picture to a specific website by selecting 'upload & store' menu from the screen. It is understood that it is able to store the taken picture only by selecting 'store' menu without uploading the taken picture.

Meanwhile, the display 151 shown in FIG. 6 or FIG. 7 can include a touchscreen. In case that the display 151 includes the touchscreen, data can be selected via a touch input. If specific data is selected, the mobile terminal 100 is able to perform various functions associated with the selected data.

For instance, while specific data is selected via a touch input, if 'E' is touched, the controller 180 is able to switch to an image for editing the selected data. While specific data is selected via a touch input, if 'D' is touched, the controller 180 is able to delete the selected data. While specific data is selected via a touch input, if 'OK' is touched, the controller 180 is able to switch to an image for checking details information on the selected data or an image for playing back the selected data.

In case that specific data is selected, the controller 180 is able to enlarge and display the selected data as shown in FIG. 7. In case that an icon 701 is touched, the mobile terminal 100 accesses a specific website to which the selected data has been uploaded. Through the access, a user is able to check the uploaded data in the accessed website.

Meanwhile, the controller 180 activates a menu for checking detailed information on data having been uploaded to a specific website or deactivates a menu for checking detailed information on non-uploaded data [S20]. If the menu for checking the detailed information on the data having been uploaded to the specific website is activated, a user is able to check upload information on the uploaded data in detail.

In case that one of a plurality of uploaded data displayed on the display 151 is selected, the controller 180 is able to display upload information on the selected data [S30, S40]. In this case, the upload information means information recorded to identify or check the uploaded data.

Figure 9:
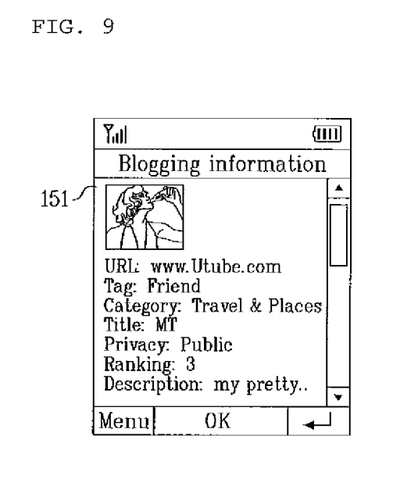

FIG. 9 is a diagram for an example that upload information on uploaded data is displayed in a mobile terminal according to one embodiment of the present invention.

Referring to FIG. 9, if data previously uploaded to a specific website is selected, upload information on the selected data is displayed on a screen. In this case, the upload information can include URL information on a webpage for checking the uploaded data, tag information on the uploaded data, a category to which the uploaded data belongs, a title of the uploaded data, a ranking count, a description for the uploaded data, a password, a privacy of the uploaded data, etc. In case that a moving picture file is uploaded data, a playtime or a file size can become the upload information. Details of the upload information will be explained later.

In this disclosure, a website to which data is uploaded means a specific web space to which data is uploaded. A specific webpage of the website means a space on web for enabling the uploaded data to be directly checked on the corresponding page. 'http://Utube.com' is an example of URL of the website and 'http://Utube.com/categories . . . ' can be an example of URL of the webpage. And, it is to be understood that the URL of the website may be equal to or may differ from the URL of the webpage.

According to one embodiment of the present invention, in case that specific information is selected from the displayed upload information, the controller 180 is able to perform a specific function associated with the selected specific information. In this case, a single specific information or a plurality of specific information can be selected. In case that the display 151 includes a touchscreen, the specific information can be selected by a touch input.

For instance, in case that URL information is selected, the controller 180 is able to access a website for enabling the uploaded data to be checked. And, the selected specific upload information can be modified. For instance, a user selects a title or a publicity (marked in 'privacy' on the screen) and then modifies the inputted contents for upload. In particular, the controller 180 is able to display an image for enabling the selected specific information to be modified.

Figure 10:
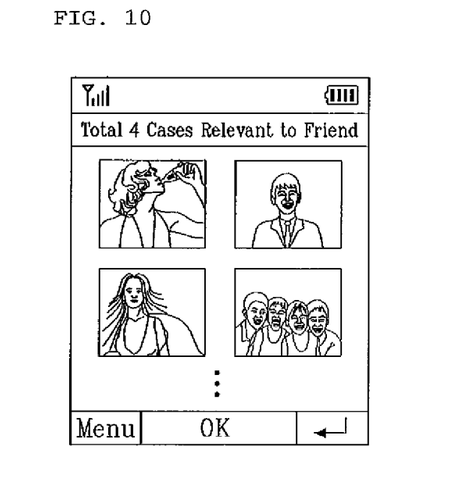

In case that 'Tag' information is selected, the controller 180 accesses the website to which the data was uploaded and then displays a search result of data relevant to a keyword inputted to 'Tag' information. This example is shown in FIG. 10. For instance, in case that a tag to which 'Friend' is inputted is selected, the controller 180 accesses the website to which the data was uploaded and then displays a search result of moving picture data including 'Friend' in Tag information.

According to one embodiment of the present invention, the mobile terminal 100 is able to further upload the data having been uploaded to the specific website to another website in addition.

Figure 11:
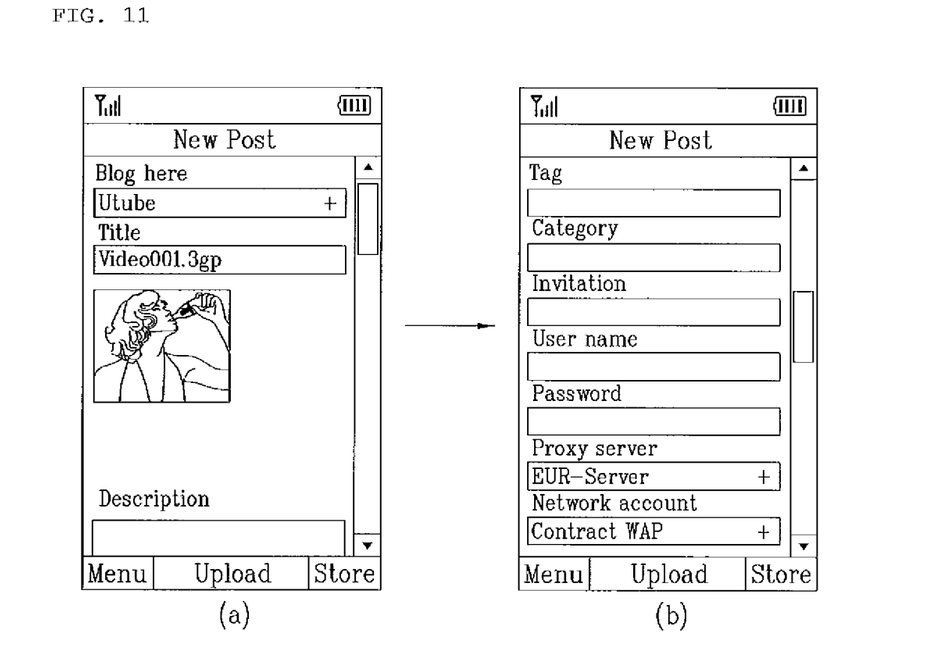

FIG. 11 is a diagram for a method of additionally uploading uploaded data in a mobile terminal according to one embodiment of the present invention.

Referring to FIG. 11, items for inputting upload information are prepared in an image displayed on a screen. The upload information means information recorded to identify or check uploaded data. The upload information include URL information on a website to which selected data will be additionally uploaded, tag information of the uploaded data, a category to which the uploaded data belongs, a title of the uploaded data, a user name, a ranking count, a description for the uploaded data, a password, publicity of the uploaded data, and the like. In case that the uploaded data is a moving picture file, the controller 180 is able to generate a playtime and size of the moving picture file as the upload information.

The URL information on the website is the information for accessing the website. In this case, URL is provided to indicate locations of files existing in servers providing services on web and includes a type of service to be accessed, a location of server (domain name), and a location of file. The tag information on the uploaded data can include an index or keyword associated with the uploaded data. The ranking count means a ranking of the uploaded data based on a specific reference. For instance, the ranking count can be determined based on the number of people having visited the uploaded data or points generated from evaluated the data by people sharing the uploaded data. And, the category is for classifying the uploaded data on website.

The publicity of the data means information on a degree of uploaded data sharing. In accordance with the degree of the uploaded data sharing, data to be uploaded can be shared with everyone (e.g., set to 'public') or specific people only (e.g., set to 'private'). In case of uploading data, a brief description for data to be uploaded can be inputted. And, this description can become the upload information. The user name is an ID for the website access and the password indicates a personal identification number for the website access.

Items for the upload information inputs include tag, category, invitation, privacy and the like. The upload information relevant to the item can be inputted by manipulating the user input unit 130. In particular, in case that the user input unit 130 includes a touchscreen configuring a mutual layer structure with the display 151, it is able to input contents for the item through a touch input. For instance, a website to which selected data will be uploaded is inputted to 'Blog here', a title of data to be uploaded is inputted to 'Title', and a keyword relevant to data to be uploaded can be inputted to 'Tag'. It is able to set whether to send an invitation message to a specific correspondent side through 'Invitation'. It is able to set whether data to be uploaded will be shared with everyone or specific people only through 'Privacy'. It is able to input a description about data to be uploaded to 'description'. In case that data to be uploaded is a moving picture file, the controller 180 is able to generate a size or playtime of the file as upload information.

In case that previously uploaded data is a moving picture file, an image relevant to a representative frame of the moving picture file can be represented as the thumbnail shown in FIG. 11. And, the controller 180 extracts a corresponding image for each prescribed frame interval and then displays the extracted images in a slide form.

Meanwhile, if 'Blog here' is selected from the image shown in (a) of FIG. 11, the controller 180 is able to display an image to select a website to which data will be additionally uploaded. This example is shown in FIG. 12.

Figure 12:
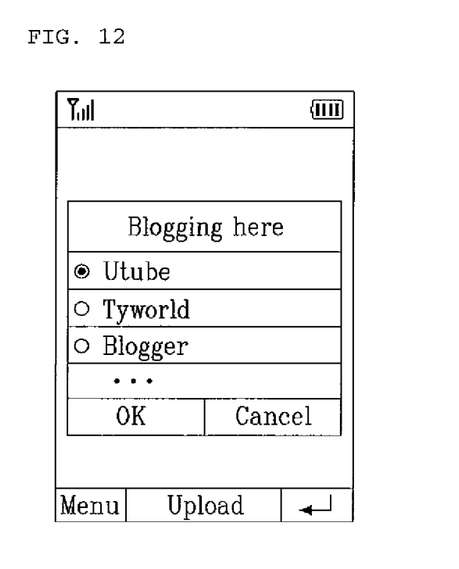

Referring to FIG. 12, in case that 'Blog here' is selected, the controller 180 is able to display a popup window for selecting a website to which data can be additionally uploaded. So, it is able to select a website to which data will be uploaded via the displayed popup window. In some cases, a user is able to select a plurality of websites. And, the website for the additional upload can be selected from bookmarked websites as well.

If the upload information input to the item is completed, a user is able to upload data to the selected website. In particular, the user is able to upload data to the specific website using 'upload' menu displayed on a lower end of the screen. Namely, if a signal for an upload command is inputted, the controller 180 accesses the selected website and then transmits data and upload information to the accessed website.

While the data is being uploaded, the mobile terminal 100 keeps accessing the specific website.

After completion of the data upload, the controller 180 is able to automatically release the access from the website. Thus, by automatically releasing the website access as soon as the upload is completed, it is able to reduce a billing for internet access. It is understood that the access to the website can be maintained despite the completion of the data upload in some cases.

Meanwhile, the mobile terminal 100 according to one embodiment of the present invention is able to display, on a standby image, update information relevant to data uploaded to a specific website. This example is shown in FIG. 13.

Figure 13:
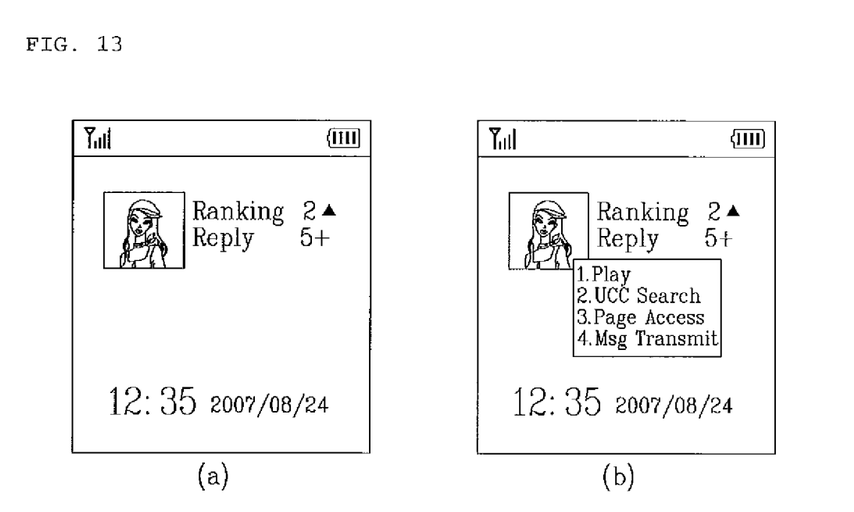

Referring to (a) of FIG. 13, the controller 180 is able to display uploaded data on a standby image. And, the data can be displayed in a thumbnail form. And, update information can be presented right to the thumbnail. For instance, ranking information and reply information are presented. The ranking information and the reply information can be updated by real time or with a prescribed time interval. The update information can include the inquiry number, the scrap number, etc.

Referring to (b) of FIG. 13, it is able to perform a specific function by selecting data displayed on a standby image. A standby image is an image displayed when the device is powered but is not in use for user initiated communication. This may also be called a dormant state or an idle state. If the standby image is displayed on a touchscreen, it is able to perform the specific function by a touch input. On the image shown in the drawing, a specific function to be performed is displayed. For instance, if 'Play' menu is selected, the controller 180 is able to play back the displayed data. F 'UCC Search' is selected, the controller 180 accesses a website to which the data was uploaded and then displays a search result of the data relevant to a keyword inputted to 'Tag' information. For instance, if a tag to which 'Friend' is inputted is selected, the controller 180 accesses a website to which data was uploaded and then displays a search result of moving picture data having 'Friend' included in tag information (shown in FIG. 10). In this case, popular data (e.g., best moving picture) can be displayed by being discriminated from other data on website. If 'Page Access' is selected, the controller 180 is able to access a webpage for checking the uploaded data. In case that 'Msg Send' is selected, the controller 180 is able to display an image for sending the aforesaid invitation message. If the mobile terminal 100 is located in a specific area, the controller 180 is able to put a specific mark on the displayed data. For instance, in case that the displayed data is a moving picture taken at An-myun island, when the mobile terminal 100 is located at An myun island, the controller 180 enables a specific light to be marked on the data through a user input.

The controller 180 is able to display the update information on the uploaded data in a detailed information check box or an indicator area as well as a standby image (not shown in the drawing). In particular, in case that uploaded data is represented in a thumbnail form, update information can be presented around the thumbnail.

Accordingly, the present invention provides the following effects or advantages.

First of all, data having been uploaded to a specific website is displayed by being discriminated from non-uploaded data, whereby data can be efficiently managed.

Secondly, upload information on uploaded data is displayed, whereby data can be efficiently managed.

According to one embodiment of the present invention, the above-described method can be implemented in a program recorded medium as computer-readable codes. The computer-readable media include all kinds of recording devices in which data readable by a computer system are stored. The computer readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a camera;
   a memory;
   a wireless communication unit;
   a touch screen display; and
   a controller connected to the memory, the touch screen display and the wireless communication unit, the controller configured to:
      display a first thumbnail image representing at least one image captured by the camera,
      display a second thumbnail image representing at least one image uploaded to a website, and
      display an icon indicator on the second thumbnail image indicating the at least one image was uploaded to the website,
      wherein the first and second thumbnail images are simultaneously displayed on the touch screen display,
      wherein when the uploaded image is deleted, the thumbnail image of the uploaded image is deleted from the memory of the mobile terminal and the website, and
      wherein the controller is further configured to display a list of a plurality of predefined websites the at least one image represented by the second thumbnail image can be additionally uploaded to, to receive a selection of one of the websites, and to upload the image the selected website.

2. The mobile terminal of claim 1, wherein the controller is configured to display, on the touch screen display, website information of a corresponding image represented by the second thumbnail and uploaded to the website.

3. The mobile terminal of claim 2, wherein the controller is further configured to distinctly display the second thumbnail image from the first thumbnail image using image brightness, image color, image type, image transparency, and image bold marks.

4. The mobile terminal of claim 3,
   wherein the website information includes URL information about the website, and
   wherein the controller is configured to control the access to the website in response to a touch to displayed URL information.

5. The mobile terminal of claim 2, wherein the controller is configured to display a screen for uploading the website information to a different website.

6. The mobile terminal of claim 5, wherein the screen includes a screen for selecting at least one website from a plurality of bookmarked websites.

7. The mobile terminal of claim 2, wherein the controller is configured to display the website information on a standby screen.

8. The mobile terminal of claim 1, wherein the controller is configured to release wireless access to the website, after the image is uploaded to the website.

9. A method of displaying data on a mobile terminal including a camera, a memory configured to store plural data items, a wireless communication unit, a touch screen display, and a controller connected to the memory, the touch screen display and the wireless communication unit, the method comprising:
- wirelessly uploading, via the wireless communication unit, images to a website;
- capturing, via the camera, images;
- displaying, via the touch screen display, a first thumbnail image representing at least one image captured by the camera;
- displaying, via the touch screen display, a second thumbnail image representing at least one image uploaded to the website;
- displaying, an icon indicator on the second thumbnail image indicating the at least one image was uploaded to the website;
- displaying a list of a plurality of predefined websites the at least one image represented by the second thumbnail image can be additionally uploaded to;
- receiving a selection of one of the websites; and
- uploading the image the selected website,
- wherein the first and second thumbnail images are simultaneously displayed on the touch screen display, and
- wherein when the uploaded image is deleted, the thumbnail image of the uploaded image is deleted from the memory of the mobile terminal and the website.

10. The method of claim 9, further comprising:
displaying on the touch screen display, website information of a corresponding image represented by the second thumbnail image and uploaded to the website.

11. The method of claim 10, wherein the displaying step distinctly displays the second thumbnail image from the first thumbnail image using brightness, image color, image type, image transparency, and image bold marks.

12. The method of claim 11,
wherein the website information includes URL information about the website, and
wherein the step of controlling the access comprises controlling the access to the website in response to a touch to displayed URL information.

13. The method of claim 10, further comprising:
displaying a screen for uploading the website information to a different website.

14. The method of claim 13, further comprising:
selecting at least one website from a plurality of bookmarked websites via the screen.

15. The method of claim 10, wherein the step of displaying the update information of the website comprises displaying the website information on a standby screen.

16. The method of claim 9, further comprising: releasing wireless access to the website, after the image is uploaded to the website.

* * * * *